United States Patent [19]
Koops

[11] Patent Number: 5,064,402
[45] Date of Patent: Nov. 12, 1991

[54] APPARATUS FOR INTERNALLY PROCESSING SLAUGHTERED POULTRY

[75] Inventor: Henderikus Koops, Oostzaan, Netherlands

[73] Assignee: Machinefabriek Meyn B.V., Oostzaan, Netherlands

[21] Appl. No.: 501,592

[22] Filed: Mar. 29, 1990

[30] Foreign Application Priority Data

May 29, 1989 [NL] Netherlands .................. 8901340

[51] Int. Cl.⁵ .......................................... A22C 21/00
[52] U.S. Cl. ...................................... 452/117; 452/118
[58] Field of Search ..................... 452/117, 106, 118

[56] References Cited

U.S. PATENT DOCUMENTS 3,886,635  6/1975  Meyn .................................. 452/117
4,951,353  8/1990  Tieleman ........................... 452/167
4,964,194 10/1990  Kessler et al. .................... 452/167

Primary Examiner—Willis Little
Attorney, Agent, or Firm—Dority & Manning

[57] ABSTRACT

An apparatus for internally processing slaughtered poultry comprises a processing device and a counter-pressure plate engaging the back of the poultry. The plate is essentially movable towards and away from the poultry. As a result, the apparatus is suited for use with poultry of different dimensions and different weight. Preferably, the counterpressure plate is attached to the piston rods of two cylinder-piston assemblies positioned one above the other.

13 Claims, 3 Drawing Sheets

APPARATUS FOR INTERNALLY PROCESSING SLAUGHTERED POULTRY

BACKGROUND OF THE INVENTION

The invention relates to an apparatus for internally processing slaughtered poultry that is suspended by its legs from a conveyor. It comprises a processing device movable into and out of the abdominal cavity of the poultry and a counterpressure plate which engages the back of the poultry.

A known apparatus of the type referred to above comprises an apparatus for removing the intestines from the inside of slaughtered poultry. During the known process the counterpressure plate presses the respective part of the poultry against the processing device; in this context, to be specific, the spine. Generally a clamping means will also be applied that will firmly press the poultry against the counterpressure plate.

A disadvantage of this known apparatus is that it is only suited for processing poultry of a certain weight. If poultry of another weight has to be processed the apparatus has to be adapted or some parts thereof should be replaced by other parts. If this isn't along it is, for example, possible that, with poultry of a lower weight, the processing device will not be correctly or, not at all, positioned inside of the slaughtered poultry but will, for example, pass in front of the poultry along the chest. Obviously, adapting the apparatus, on the one hand, decreases its productivity and, on the other hand, leads to an increase of costs.

SUMMARY OF THE INVENTION

It is an object of the invention to provide an apparatus of the type referred to above, that, in a simple but nevertheless effective way, solves this disadvantage.

To achieve this object the invention is characterized in that the counterpressure plate is movable towards and away from the poultry.

Depending on the weight of the poultry to be processed, the counterpressure plate is movable towards and away from the poultry.

Depending on the weight of the poultry to be processed, the counterpressure plate adapts to different positions. These positions are chosen so that the processing device will correctly enter the abdominal cavity of the poultry.

According to a preferred embodiment of the invention the counterpressure plate is attached to the piston rods of the two cylinder-piston assemblies, positioned one above the other. Moving the counterpressure plate is now extremely simple by appropriately activating the two cylinder-piston assemblies.

Moreover, it is advantageous if the counterpressure plate is also tiltable about an axis that is parallel to its plane and perpendicularly to the spine of the poultry. Constructively, this can be realized if the connection between the piston rods and the counterpressure plate comprises a hinge whereas further one of the cylinder-piston assemblies is hingeably attached to the apparatus. By means of an appropriate combination of the motion of the counterpressure plate towards or away from the poultry as well as a tilting about the mentioned axis the counterpressure plate can support the poultry in a most optimal way relative to the processing device. In the case of an apparatus for removing the intestines this means that the processing device, which during the removal of the intestines scrapes along the spine, may follow the natural shape of this spine in an optimal way.

The adaptation of the position of the counterpressure plate to the position of the processing device as well as to the dimensions of the poultry to be processed occurs automatically in a very simple way. According to one embodiment of the apparatus according to the invention the piston rods engage the counterpressure plate with an adjustable constant force. For example, this can be realized easily by pressurizing the cylinder-piston assemblies with a predetermined settable pressure. The tilting of the counterpressure plate occurs so that the force applied on to the processing device remains substantially constant. In this way the processing device, for example, follows the spine so that a nearly constant force is applied thereto continuously.

Further, the invention relates to a turntable-like processing apparatus with, regularly spaced about its circumference, a number of apparatuses for internally processing slaughtered poultry according to the invention. This turntable-like processing apparatus comprises a curved track and has means cooperating therewith for activating the respective counterpressure plates, where at least part of the curved track is selectively engageable and disengageable with the activating means.

The apparatuses for carrying out the process are provided with cylinder-piston assemblies moving the counterpressure plate and the cooperation between the curved track and the activating means leads to an activation of these cylinder-piston assemblies. In this respect this activation, on the one hand, could mean moving the counterpressure plate (depending on the weight or the dimensions of the poultry) essentially towards or away from the poultry or, on the other hand, the engagement of the piston rods of this cylinder-piston assemblies on the counterpressure plate with a constant force. The part of the curved track that selectively can be placed into and out of engagement with the activating means hereby is meant for the activation of the cylinder-piston assemblies on the counterpressure plate with a constant force. The part of the curved track that selectively can be placed into and out of engagement with the activating means hereby is meant for the activation of the cylinder-piston assemblies for moving the counterpressure plate towards or away from the poultry. This engagement and disengagement of the corresponding part of the curved track may be realized by activation of a manual operating means, such as a switch.

Another possibility is obtained by another embodiment of the processing apparatus according to the invention, which comprises means for determining the weight or the dimensions of the poultry and for, depending thereon, bringing the respective curved track part into or out of engagement, respectively, with the activating means using appropriate motion means, such as cylinder-piston assemblies or the like. Now bringing the respective curved track part into or out of engagement, respectively, with the activating means occurs completely automatically. The counterpressure plate always takes up the proper position for correctly positioning the process device into the abdominal cavity of the poultry irrespective of the weight of this poultry.

Further it is advantageous, according to a further embodiment of the processing apparatus according to the invention, is a curved track section is positioned behind the curved track part and cooperates with the activating means for obtaining the constant force applied to the counterpressure plate. Cooperation between the activating means and the curved track section results in an activation of the cylinder-piston assemblies with the previously set pressure.

BRIEF DESCRIPTION OF THE DRAWINGS

Hereinafter the invention will be further elucidated by means of the drawing, in which an embodiment of the invention is illustrated.

DETAILED DESCRIPTION OF THE INVENTION

Figure 1A:
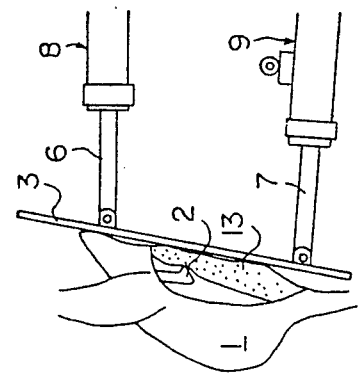
FIG. 1 is a three-part side view which shows a part of an embodiment of the apparatus according to the invention while processing poultry of a first weight in different positions.

In FIGS. 1 and 2, a processing device 2, movable into and out of the abdominal cavity of poultry 1, and a counterpressure plate 3 engaging the back of the poultry 1 are shown of an apparatus for internally processing slaughtered poultry that with its legs is suspended from a conveyor.

By means of hinges 4 and 5 the counterpressure plate 3 is attached to the piston rods 6 and 7 of two cylinder-piston assemblies 8 and 9, respectively, positioned one above the other. In the illustrated embodiment the upper cylinder-piston assembly 8 is rigidly connected to the apparatus, about a pivot point 10. In this way the required freedom of movement is provided for the counterpressure plate 3.

In its resting position the counterpressure plate 3 is, in the situation illustrated in dotted lines in FIG. 1a, where the processing device 2 is also in its in dotted lines represented position. For correctly positioning the poultry 1 below the processing device 2, so that processing device 2 can be moved into the abdominal cavity between the chest bone and the spine of the poultry, the counterpressure plate 3 is, by activation of the cylinder-piston assemblies 8, 9 moved to the left until reaching the position shown in FIG. 1a. After reaching this position the processing device 2, in a way known per se, can be positioned into the abdominal cavity of the poultry 1 until reaching the position illustrated in full lines in FIG. 1b.

A displacement of the counterpressure plate 3 as represented in FIG. 1a occurs if the dimensions of the poultry to be processed are small and the processing device 2 would pass outside of the poultry 1 along the belly thereof if the poultry 1 is not moved to the left by the counterpressure plate 3.

Figure 2A:
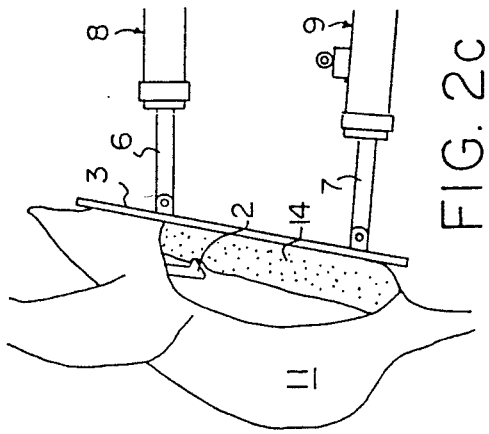
FIG. 2 is a three-part side view which shows the apparatus according to FIG. 1 in corresponding positions while processing poultry of a greater weight.

FIG. 2a shows that a displacement of the counterpressure plate 3 is not necessary with poultry 11 having larger dimensions. In this case, the dimensions of the poultry 11 are such that the processing device 2, without any problems, can be provided into the abdominal cavity.

It is important to note two things. Firstly, in the shown embodiment the counterpressure plate 3 is represented in a vertical position. This is not necessary. It is possible that the counterpressure plate 3 in its resting position and/or in the position shown in FIG. 1a is at an angle with the perpendicular. Secondly, in FIGS. 1a and 2a the track of motion f the processing device 2 is schematically indicated by a dashed and dotted line. In reality, the processing device 2 generally will not follow a straight line but a curved trajectory, so that processing device 2, during its inward motion into the abdominal cavity, will move closely along the chest bone of the poultry to be processed 1 and 11, respectively. However, such a motion requires, with poultry having small dimensions, that the counterpressure plate 3 be moved to the left, as shown in FIG. 1a, before positioning the processing device 2 into the abdominal cavity.

The displacement of the counterpressure plate 3, described previously, depends on the weight and the dimensions of the poultry to be processed. Especially, if the poultry is constituted by turkeys the variations in weight can be considerable (for example, from 4 to 22 kg). In practice, it appears that the apparatus according to the invention satisfies the requirements if the poultry is divided into two weight groups; a lower weight group and a higher weight group. Moreover, this means that the counterpressure plate 3, for positioning the processing device 2 into the abdominal cavity, should only assume two different positions, namely the position as illustrated in FIG. 2a for large poultry and the extended position for small poultry, as illustrated in FIG. 1a.

After the processing device 2 is positioned at the required depth into the abdominal cavity of the poultry 1 or 11, respectively, the activation of the cylinder-piston assemblies 8 and 9 is stopped for a short while. As a result, the processing devices 2 will be positioned correctly into the abdominal cavity of the poultry, whereafter the next step of the process can be carried out.

Figure 1B:
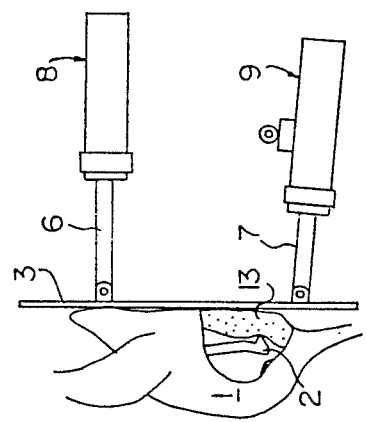
Figure 1C:
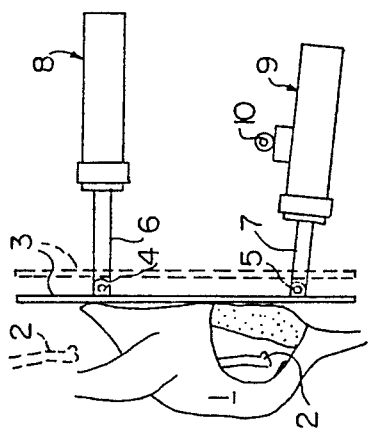
Figure 2B:
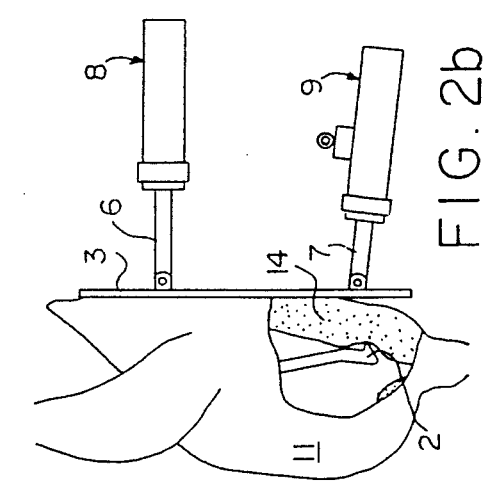
Figure 2C:
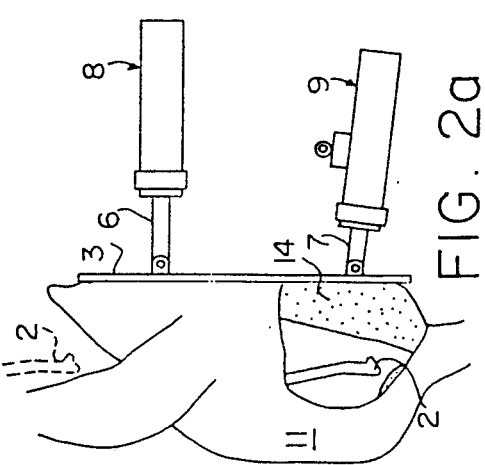

During the next step the cylinder-piston assemblies 8 and 9 are activated again while the counterpressure plates 3 assume a position as represented in FIGS. 1b and 2b. In the present case the processing devices 2 are pressed against the spine 13 and 14 of the poultry 1 and 11, respectively. The engagement of the spine of the poultry by the processing device 2 may be required if the processing device 2 is meant for removing the intestines from the innerside of slaughtered poultry.

The force with which the piston rods 6, 7 of the cylinder-piston assemblies 8, 9 will now engage the counterpressure plate 3 is such that it is constant irrespective of the position of the counterpressure plate. As a result, the force with which a processing device 2, in the present case, engages the spine 13 and 14, respectively, is also constant during the motion of the processing device 2 along the spine. This has been indicated in FIGS. 1c and 2c. During the upward motion of the processing device 2 the constant force applied onto the counterpressure plate 3 by the piston rods 6 and 7 brings about a tilting of the counterpressure plate 3 when the processing device 2 is moved along the spine. The tilting of the counterpressure plate 3 is such that the force, with which the processing device 2 engages the spine 13 and 14, respectively, remains substantially constant. Besides being able to tilt the counterpressure plate 3 also can move to and fro during a displacement of the processing device 2. As a result of the freedom of motion of the counterpressure plate 3 against the force applied by the piston rods 6 and 7 the processing device 2 can exactly follow the irregularities of the spine 13 and 14, respectively, for the poultry 1 and 11, respectively, is moved correspondingly.

After removing the processing device 2 from the abdominal cavity the poultry can be removed and the counterpressure plate 3 can assume its starting position.

It is noted, that for positioning and holding the poultry 1 and 11 a part of the movable counterpressure plate 3 illustrated is selectively activatable. The chest of the poultry 1 is engageable by clamping means. This is known per se.

Figure 3:
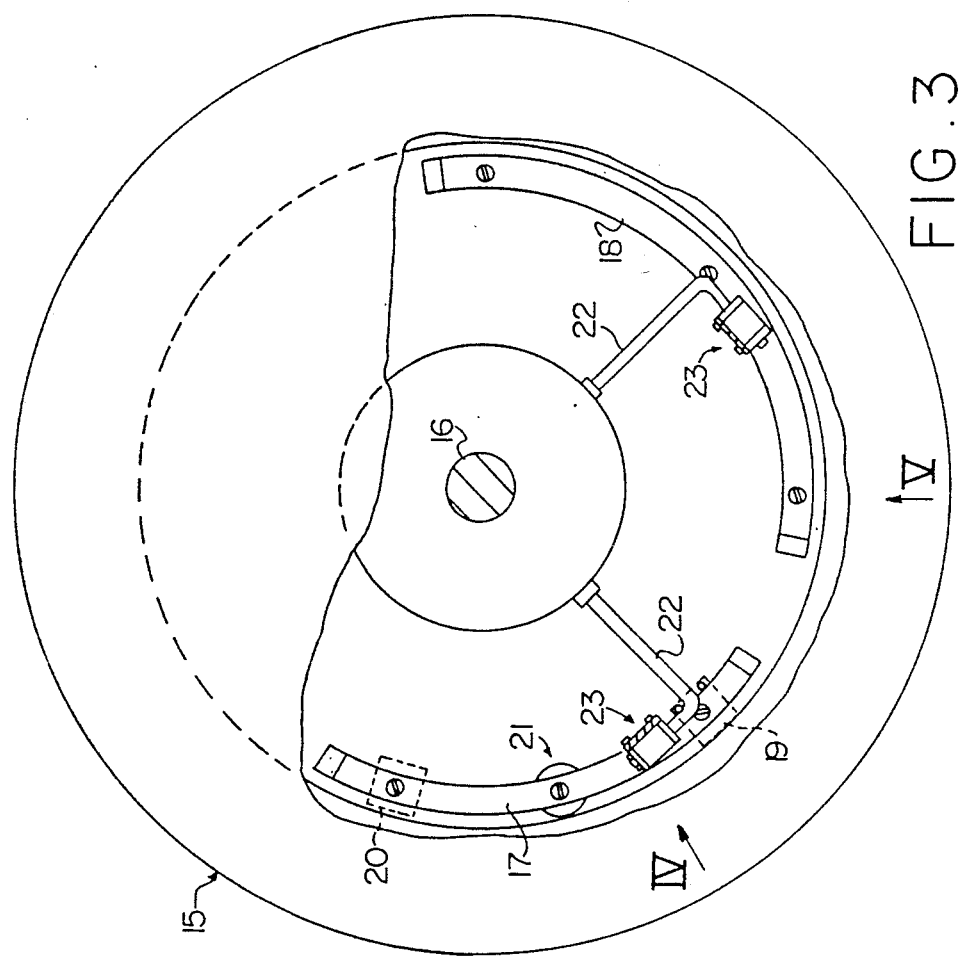
FIG. 3 is a schematic top plan view of a part of a turntable-like processing apparatus which is provided with a number of apparatuses according to the invention.
Figure 4:
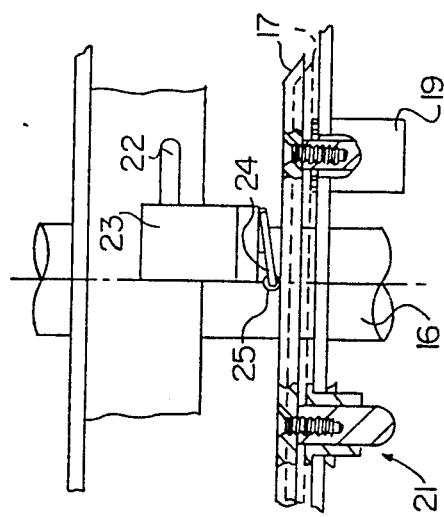
FIG. 4 is a side view looking in the direction of arrow IV in FIG. 3.
Figure 5:
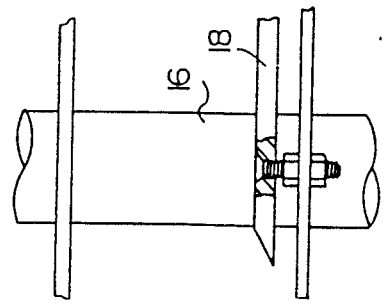
FIG. 5 is a side view looking in the direction of arrow V in FIG. 3.

In FIGS. 3 through 5, it is indicated schematically how the cylinder-piston assemblies 8 and 9 are selectively activated. These Figures relate to a turntable-like processing apparatus, which has been illustrated in a top view in FIG. 3 and which carries, regularly spaced about its circumference, a number of apparatuses of the type shown in FIGS. 1 and 2. These apparatuses are not illustrated in FIG. 3.

The turntable-like processing apparatus 15 comprises a central axle 16 about which the apparatus 15 rotates. Connected with this central axle 16, and therefore stationary, are curved track sections 17 and 18. The curved track section 17, of which a part has been illustrated in a side view in FIG. 4, is, in a restricted way, movable upwards and downwards by means of cylinder-piston assemblies 19, 20. The lower position is illustrated in FIG. 4 in dotted lines. Further, a guide 21 (not shown in detail) is provided for obtaining a controlled movement of the curved track 17.

As appears from the side view according to FIG. 5 the curved track section 18 has been fixed at a certain height.

Attached to the rotating part of the turn-table-like processing apparatus 15 are activating means 23 attached to redial arms 22. Each activating means 23 is part of an apparatus comprising the two cylinder-piston assemblies, 8 and 9, and the counterpressure plate 3 and synchronously rotates therewith about the central axle 16.

At its lower side each activating means 23 comprises a follower roll 25 attached to a pivotable arm 24. If the follower roll 25 is moved upwardly by a curved track section the arm 24 pivots as a result of which the activating means 23 is activated which leads to an activation of the cylinder-piston assemblies 8 and 9.

If the curved track section 17 is in the lower position shown in dotted lines in FIG. 4 the follower rolls 25 of the activating means 23 do not engage the curved track section 17. Therefore, in this case no activation of the cylinder piston assemblies 8 and 9 occurs and the counterpressure plate 3 is not displaced. The lower position of the curved track section 17 corresponds with the processing poultry having a larger weight, as represented in FIG. 2. If poultry having a lesser weight (according to FIG. 1) now has to be processed the cylinder-piston assemblies 19 and 20 are activated as a result of which the curved track section 17 is moved towards the upper position shown in FIG. 4. During the rotation of the processing apparatus 15 the follower roll 25 of activating means 23 now engages curved track section 17 as a result of which a pivoting of the arm 24 activates the activating means 23, leading to the activation of the cylinder-piston assemblies 8 and 9 so that the counterpressure plate 3 is moved towards the position shown in FIG. 1a. A further rotation of the processing apparatus leads to a disengagement between the follower roll 24 and the curved track section 17 and reaching the curved track section 18. Irrespective of the dimensions of the poultry to be processed each activating means 23 will be engaged by this curved track section 18. Therefore, an activation of the cylinder-piston assemblies 8, 9 will always occur with a preset constant pressure.

When the follower roll 24 has passed the curved track section 18 the cylinder-piston assemblies 8 and 9 move back to their starting positions, whereas the poultry is released and the respective apparatus is ready to receive new poultry.

Moving the curved track section 17 upwards and downwards (this means the activation of the cylinder-piston assemblies 19 and 20) can be achieved manually. Thus, an operator can manually activate an appropriate switch. It is possible, however, for this to occur automatically, so that the processing apparatus is provided with means for determining the weight or the dimensions of the poultry and, depending thereon engaging or disengaging, respectively, the activating means 23 with the curved track section 17. When the mentioned means determine that poultry with a lower weight has to be processed the curved track section 17 is automatically displaced towards the upper position shown in FIG. 4.

Figure 6:
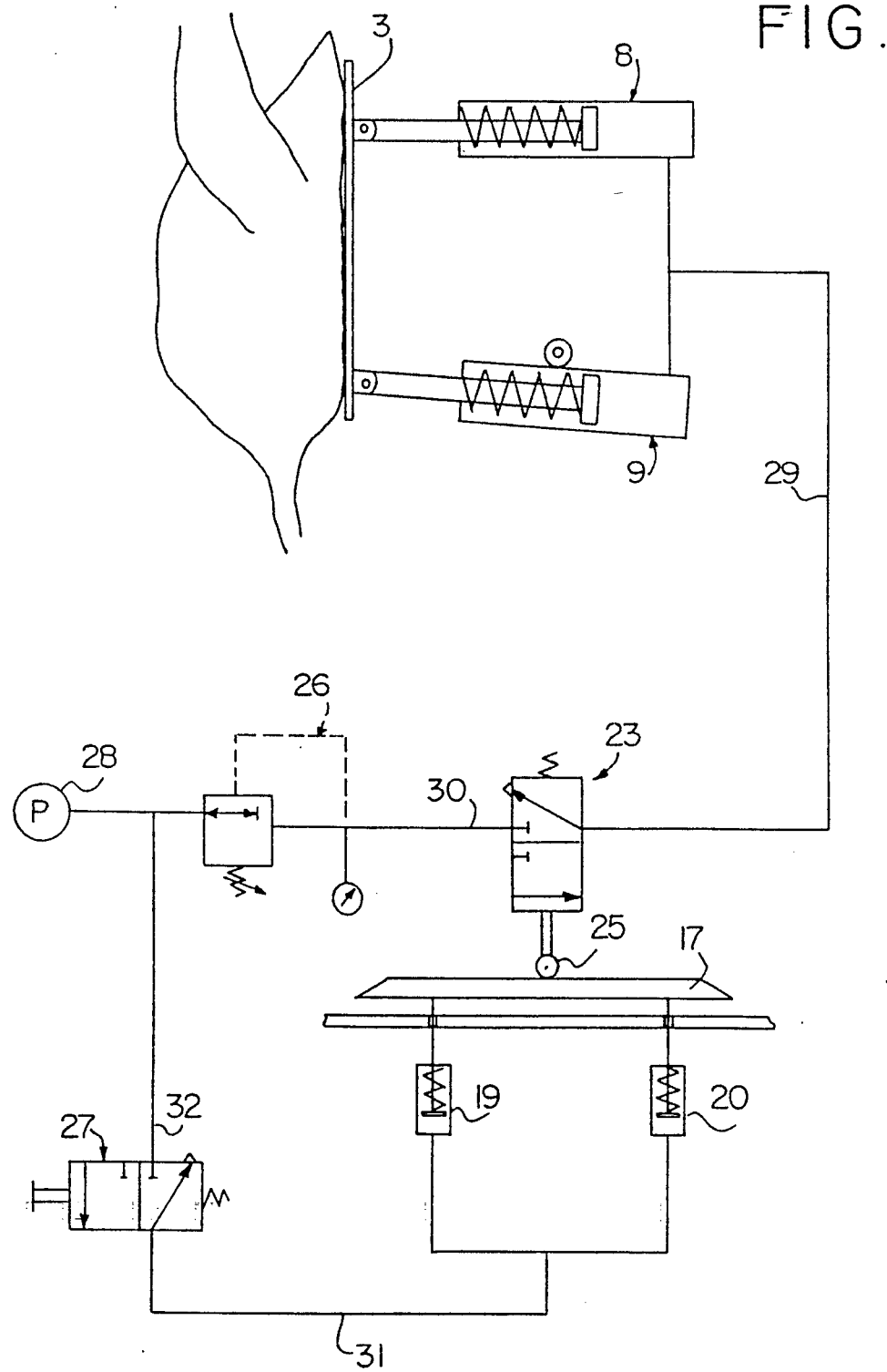
FIG. 6 is a schematic functional diagram of the apparatus according to the invention.

In FIG. 6 a schematic functional diagram of the previously described apparatus is illustrated. Visible are the counterpressure plate 3, the cylinder-piston assemblies 8 and 9, an activating means 23, follower roll 25, movable curved track section 17, cylinder-piston assemblies 19 and 20, a pressure setting device 26, a switch 27 and a pressure source 28.

By means of the pressure setting device 26 the pressure is set with which the cylinder-piston assemblies 8, 9 are activated. This activation occurs when the activating means 23 is operated by means of the follower roll 25, as a result of which the pressure line 29 is connected with the pressure line 30. Operating the activating means 23 by means of the follower roll 25 occurs if this follower roll 25 engages the curved track section 17. Then, however, this curved track section 17 should be moved towards its upper position by means of the cylinder-piston assemblies 19 and 20. This happens if the switch 27 is closed and the pressure line 31 is connected with the pressure line 32.

Not represented in the diagram according to FIG. 6 is the curved track section 18 that too operates the activating means 23 via the follower roll 25, as a result of which the pressure set by means of the pressure setting device 26 is applied to the cylinder-piston assemblies 8 and 9.

The invention is not restricted to the described embodiment and can be varied widely within the scope of the invention.

I claim:

1. Apparatus for internally processing slaughtered poultry of varying sizes and weights, comprising:
    (a) a processing device disposed to move into and out of abdominal cavities of poultry of varying sizes and weights;
    (b) a counterpressure plate disposed to engage the backs of poultry being processed by said processing device;
    (c) support means for supporting said counterpressure plate for movement towards and away from said poultry being processed by said processing device; and (d) resilient means for moving said support means and said counterpressure plate to engage the backs of poultry being processed by said processing device in different positions depending upon the sizes and weights of said poultry.

2. Apparatus as set forth in claim 1, wherein said resilient means comprises a plurality of pressurized cylinder-piston assemblies having piston rods attached to said supporting means for said counterpressure plate.

3. Apparatus as set forth in claim 1, wherein said support means for supporting said counterpressure plate is pivotally connected to said resilient means and is tiltable about at least one axis which is parallel to the plane of said plate and perpendicular to the spine of poultry being processed in said apparatus.

4. Apparatus as set forth in claim 2, wherein the pressure in said cylinder-piston assemblies is adjustable.

5. A machine for internally processing slaughtered poultry, comprising:

(a) a turntable having a plurality of apparatuses disposed about its circumference, each of which apparatuses comprises:

(1) a processing device disposed to move into and out of abdominal cavities of said poultry of varying sizes and weights;

(2) a counterpressure plate disposed to engage the backs of poultry being processed by said processing device;

(3) support means for supporting said counterpressure plate for movement towards and away from poultry being processed by said processing device; and (4) resilient means for moving said support means and said counterpressure plate to engage the backs of poultry being processed by said processing device in different positions, depending upon the sizes and weights of said poultry; and (b) activating means comprising a curved track and means cooperating therewith for activating said resilient means to move said counterpressure plate to engage the backs of said poultry.

6. A machine as set forth in claim 5, wherein said curved track is selectively engageable and disengageable with said cooperating means.

7. A machine as set forth in claim 6, further comprising means for determining the weight and the size of the poultry and for bringing a part of said curved track into and out of engagement with said cooperating means to move said counterpressure plate into contact with the backs of said poultry.

8. A machine as set forth in claim 5, wherein a portion of said curved track engages said cooperating means to provide a constant counter-force to said counterpressure plate.

9. A machine as set forth in claim 5, wherein said activating means comprises valves controlled by follower rolls cooperating with said curved track.

10. Apparatus for internally processing slaughtered poultry of varying sizes and weights, comprising:

(a) a processing device disposed to move into and out of abdominal cavities of said poultry in a predetermined path;

(b) a counterpressure plate resiliently supported on support means movable towards and away from poultry being processed by said processing means; and (c) means for selectively moving said support means and said counterpressure plate into a plurality of positions to engage the backs of poultry of varying sizes and weights.

11. Apparatus as set forth in claim 10, wherein said support means includes two pressurized cylinder-piston assemblies having piston rods pivotally connected to said counterpressure plates on the side opposite the side of said plate in contact with said poultry.

12. Apparatus as set forth in claim 11, wherein one of said cylinder-piston assemblies is pivotally supported.

13. Apparatus as set forth in claim 11, wherein one of said cylinder-piston assemblies is supported in a fixed position.

* * * * *